United States Patent [19]

Komatsu

[11] Patent Number: 4,713,302

[45] Date of Patent: Dec. 15, 1987

[54] SINTERED CERAMIC BODY

[75] Inventor: Michiyasu Komatsu, Yokohama, Japan

[73] Assignee: Tokyo Shibaura Denki Kabushiki Kaisha, Kawasaki, Japan

[21] Appl. No.: 869,820

[22] Filed: Apr. 30, 1986

Related U.S. Application Data

[63] Continuation of Ser. No. 563,446, Dec. 20, 1983, abandoned.

[30] Foreign Application Priority Data

Dec. 22, 1982 [JP] Japan ............................... 57-225417

[51] Int. Cl.$^4$ ............................................... B32B 15/04
[52] U.S. Cl. ..................................... 428/698; 428/701; 428/428; 427/419.7; 427/419.4
[58] Field of Search ............... 428/698, 699, 701, 446, 428/428, 432; 427/41.97, 419.4

[56] References Cited

U.S. PATENT DOCUMENTS

| | | | |
|---|---|---|---|
| 3,824,120 | 7/1974 | Davidge et al. | 428/446 |
| 3,993,844 | 11/1973 | Kiger et al. | 428/446 X |
| 4,104,442 | 8/1978 | Sussmuth | 428/446 X |
| 4,234,661 | 11/1980 | Lee et al. | 428/446 |
| 4,312,899 | 1/1982 | Lahmann | 428/698 X |
| 4,384,909 | 5/1983 | Layden | 428/446 X |
| 4,400,427 | 8/1983 | Moschetti et al. | 428/446 X |
| 4,406,668 | 9/1983 | Sarin et al. | 428/698 X |
| 4,613,549 | 9/1986 | Tanaka | 428/698 X |

FOREIGN PATENT DOCUMENTS

| | | |
|---|---|---|
| 0082371 | 2/1980 | European Pat. Off. . |
| 0015421 | 3/1982 | European Pat. Off. . |
| 0071997 | 3/1985 | European Pat. Off. . |

OTHER PUBLICATIONS

European Search Report dated May 17, 1984.
Chemical Abstracts, vol. 94, p. 328, No. 39106a.

*Primary Examiner*—Nancy A. Swisher
*Attorney, Agent, or Firm*—Cushman, Darby & Cushman

[57] ABSTRACT

A sintered ceramic body has a surface layer containing yttrium silicate, cristobalite and silicon nitride, and mainly consists of silicon nitride. The silicon ceramic body is manufactured by preparing a composition containing a silicon nitride powder and an yttrium oxide powder, forming and sintering the composition, and heat-treating the sintered body in an oxidizing atmosphere. The ceramic body has a high mechanical strength over its entire surface and has little variation in mechanical strength.

10 Claims, No Drawings

SINTERED CERAMIC BODY

This is a continuation of application Ser. No. 563,444, filed Dec. 20, 1983 now abandoned.

BACKGROUND OF THE INVENTION

The present invention relates to a sintered ceramic body which mainly consists of silicon nitride.

Recently, ceramics have frequently been used for engine parts or the like.

Such a ceramic part is obtained by forming a ceramic into a predetermined shape and sintering the formed ceramic body, or cutting a sintered ceramic body into a predetermined shape.

However, a sintered ceramic body of a complex shape such as a turbine rotor has low local mechanical strength and variations in its overall mechanical strength. This is considered to be attributable to the following reason. Since a part having a complex shape is difficult to form by press forming it is therefore manufactured by cutting or grinding a formed, sintered ceramic body. Thus, the resultant part has both a cut or ground surface and a non-cut or non-ground surface (sintered surface).

According to experiments conducted by the present inventors, it was found out that the mechanical strength of a sintered surface is about 40 to 70% that of a cut or ground surface. It was also found out that the sintered surface has great variations in mechanical strength and lacks uniformity. For this reason, a part having a partially sintered surface is considered to have variations in mechanical strength, thus impairing various properties of the part.

SUMMARY OF THE INVENTION

It is an object of the present invention to provide a sintered ceramic body which has a high mechanical strength over its entire surface and which has little variation in mechanical strength.

According to the present invention, there is provided a sintered body of silicon nitride-based ceramics, which contains yttrium oxide and which has a surface layer containing yttrium silicate, cristobalite and silicon nitride. The surface layer has a thickness of 1 to 100 $\mu$m and preferably 5 to 50 $\mu$m. The surface of the sintered body may have a cut or ground surface portion in addition to the surface layer.

Said sintered body may contain at most 10% by weight (excluding 0% by weight) of yttrium oxide.

Said sintered body may further contain at least one member selected from the group consisting of aluminum oxide and aluminum nitride in amounts of at most 10% by weight (excluding 0% by weight), and titanium oxide, zirconium oxide, magnesium oxide and molybdenum carbide in amounts of at most 5% by weight (excluding 0% by weight), respectively.

The sintered ceramic body of the present invention is manufactured by a method comprising the steps of: preparing a composition containing a silicon nitride powder and an yttrium oxide powder; forming the composition into a formed body; sintering the formed body in a non-oxidizing atmosphere at a temperature of 1,600° to 1,900° C; and heat-treating the sintered body in an oxidizing atmosphere at a temperature of 800° to 1,200° C.

The yttrium oxide powder added to the main component of the composition, that is, the silicon nitride powder, herein serves as a sintering accelerator. The yttrium oxide powder may be used together with another sintering accelerator such as an aluminum oxide powder, an aluminum nitride powder, a titanium oxide powder, a zirconium oxide powder, a magnesium oxide powder, molybdenum carbide powder or a mixture thereof.

DETAILED DESCRIPTION OF THE PREFERRED EMBODIMENT

As the sintering accelerator to be used herein, an yttrium oxide powder can be used in the amount of at most 10% (exclusive of 0% by weight); an aluminum oxide powder, at most 10% (exclusive of 0% by weight); an aluminum nitride powder, at most 10% (exclusive of 0% by weight); and a titanium oxide powder, a zirconium oxide powder, a magnesium oxide powder, and a molybdenum carbide powder at most 5% (exclusive of 0% by weight), respectively. When these sintering accelerators are used together with the yttrium oxide powder, the resultant surface layer contains yttrium oxide or oxides and silicates of titanium, zirconium, magnesium and molybdenum and the like in addition to yttrium silicate, cristobalite, and silicon nitride.

In the method of manufacturing the sintered ceramic body of the present invention, a step for cutting or grinding a portion of the sintered surface may be incorporated between the sintering step and the heat-treating step. The heat-treating step is performed in an oxidizing atmosphere at a temperature of 800° to 1,200° C. for 1 to 200 hours and preferably at a temperature of 900° to 1,100° C. for 5 to 150 hours.

The sintering step is performed in a non-oxidizing atmosphere at a temperature of 1,600° to 1,900° C. for 0.5 to 10 hours and preferably at a temperature of 1,700° to 1,800° C. for 1 to 4 hours.

When the heat-treating step is performed at a temperature below 800° C., a satisfactory improvement in mechanical strength cannot be obtained. On the other hand, if the heat-treating temperature exceeds 1,200° C., the mechanical strength is impaired. Such an improvement in mechanical strength is considered to be attributable to the following. A sintered surface has small pores and has a mechanical strength lower than that inside the sintered body. However, upon heat treatment, a surface layer (glass layer etc.) is formed in the pores to improve the mechanical strength.

The silicon nitride powder and the sintering accelerator powder to be used herein may have an average particle size of 0.1 to 5 $\mu$m, preferably 0.5 to 1 $\mu$m.

When the type of a sintering accelerator to be used herein is properly selected, the main body of the sintered body, excluding the surface layer, may be formed of a silicon nitride-based ceramic called SIALON.

The present invention will now be exemplified by way of an Example and a Comparative Example.

EXAMPLE 1

A mixture was prepared which consisted of 90% by weight of a silicon nitride powder having an average particle size of about 0.9 $\mu$m, 7% by weight of an yttrium oxide powder having an average particle size of about 1 $\mu$m, and 3% by weight of an aluminum oxide powder having an average particle size of about 1 $\mu$m. The mixture was formed into a sample having dimensions of 50×50×10 mm. The sample was sintered in a nitrogen atmosphere at 1,700° C. for 2 hours. After cutting and grinding a surface part having dimensions of 50×50 mm of the sintered body, the sintered body was subjected to a heat treatment in the air at 1,000° C. for 150 hours. X-ray diffractiometry of the resultant body revealed that the non-ground surface was a surface layer having a thickness of about 30 μm and comprising silicon nitride, cristobalite, and yttrium silicate.

The non-ground surface of the resultant sintered ceramic body had a mechanical strength of 90 kg/mm$^2$ and the ground surface thereof had a mechanical strength of 100 kg/mm$^2$. The sintered ceramic body had a Weibull cofficient m of 15 and exhibited excellent uniformity (the Weibull coefficient m represents degree of uniformity; a higher Weibull coefficient m indicates a higher uniformity).

COMPARATIVE EXAMPLE

A sintered body similar to that prepared in the Example was similarly cut and ground but was not heat-treated. X-ray diffractiometry of the resultant sintered ceramic body revealed that the cut and ground and non-cut and ground surfaces of the body comprised a crystalline material of silicon nitride and a crystalline material of yttrium oxide and silicon nitride. The non-cut and ground surface of the sintered body had a mechanical strength of 50 kg/mm$^2$, while the cut and ground surface thereof had a mechanical strength of 100 kg/mm$^2$. The sintered ceramic body had a Weibull coefficient m of 5.

EXAMPLE 2

A rotor for a turbo charger was produced by using a sintered body of the present invention. Cutting can be applied to the rotary shaft portion of a rotor prepared by injection molding. But, it is difficult to apply cutting to the vane portion of the rotor. Thus, cutting was applied to the rotary shaft portion of the rotor formed of the sintered body of the present invention, followed by applying heat treatment to the rotor. The resultant rotor was found to exhibit a high mechanical strength.

As may be seen from the Example, a sintered ceramic body of the present invention has a cut and/or ground surface and a non-cut and/or ground surface which have equivalent mechanical strengths, resulting in an excellent uniformity of the overall sintered body. According to the present invention, a sintered ceramic body of a complex shape involving both a cut and/or ground surface and a non-cut and/or ground surface can have a high mechanical strength and little variation in mechanical strength.

What is claimed is:

1. A sintered body of silicon nitride-based ceramics which contains at most 10% by weight of yttrium oxide and at most 10% by weight of aluminum oxide and which has a surface layer consisting essentially of yttrium silicate, cristobalite and silicon nitride.

2. A sintered body according to claim 1, wherein said surface layer has a thickness of 1 to 100 μm.

3. A sintered body according to claim 1, wherein a surface of said sintered body has a cut and/or ground surface in addition to said surface layer.

4. A sintered body according to claim 3, wherein said sintered body further contains at least one member selected from the group consisting of aluminum nitride in amount of at most 10% by weight, and at most 5% by weight of one or more compounds selected from titanium oxide, zirconium oxide, magnesium oxide and molybdenum carbide.

5. A method for manufacturing a sintered body of silicon nitride-based ceramics, comprising the steps of:
   preparing a composition containing a silicon nitride powder, and an yttrium oxide powder;
   forming the composition into a formed body;
   sintering the formed body in a non-oxidizing atmosphere at a temperature of 1,600° to 1,900° C.; and
   heat-treating the sintered body in an oxidizing atmosphere at a temperature of 800° to 1,200° C. to form a surface layer consisting essentially of yttrium silicate, cristobalite, and silicon nitride on the sintered body.

6. A method according to claim 5, further comprising the step of cutting and/or grinding a part of the surface of said sintered body after said sintering step.

7. A method according to claim 5, wherein said composition further contains at least one member selected from the group consisting of aluminum oxide powder, aluminum nitride powder, titanium oxide powder, zirconium oxide powder, magnesium oxide powder and molybdenum carbide powder.

8. A method according to claim 7, wherein the aluminum oxide powder and aluminum nitride powder are used in amounts of at most 10% by weight (excluding 0% by weight), and the titanium oxide powder, the zirconium oxide powder, the magnesium oxide powder, and the molybdenum carbide powder are used in amounts of at most 5% by weight (excluding 0% by weight).

9. A method according to claim 5, wherein said surface layer has a thickness of 1 to 100 μm.

10. A method according to claim 5, wherein said composition contains at most 10% by weight (excluding 0% by weight) of yttrium oxide powder.

* * * * *

UNITED STATES PATENT AND TRADEMARK OFFICE
CERTIFICATE OF CORRECTION

PATENT NO. : 4,713,302

DATED : Dec. 15, 1987

INVENTOR(S) : Michiyasu KOMATSU

It is certified that error appears in the above-identified patent and that said Letters Patent is hereby corrected as shown below: On the Title Page Box [22] should read:  --Filed:  May 30, 1986--

Box [63] should read:  --Continuation of Ser. No. 563,444

Dec. 20, 1983, abandoned--

Signed and Sealed this

Ninth Day of August, 1988

Attest:

DONALD J. QUIGG

Attesting Officer        Commissioner of Patents and Trademarks